United States Patent [19]

Pellar

[11] 4,115,597

[45] Sep. 19, 1978

[54] METHOD FOR MAINTAINING UNIFORM LEVEL OF ANTI-OXIDANT IN HEATED COOKING OIL

[76] Inventor: Marshall Pellar, 1550 via Corona, La Jolla, Calif. 92037

[21] Appl. No.: 755,244

[22] Filed: Dec. 29, 1976

[51] Int. Cl.² .............................................. A23L 3/34
[52] U.S. Cl. .................................... 426/541; 426/601; 426/417
[58] Field of Search ............... 426/541, 417, 438, 439, 426/440, 441, 601

[56] References Cited

U.S. PATENT DOCUMENTS

| | | | |
|---|---|---|---|
| 3,210,193 | 10/1965 | Martin | 426/541 |
| 3,507,665 | 4/1970 | Henthorn | 426/546 X |
| 3,733,202 | 5/1973 | Marmor | 426/441 |
| 3,955,005 | 5/1976 | Trelease et al. | 426/546 X |

*Primary Examiner*—Robert A. Yoncoskie
*Attorney, Agent, or Firm*—Brown & Martin

[57] ABSTRACT

A deep fat cooking vessel is provided with a dispensing apparatus including a reservoir for containing a quantity of anti-oxidant and suitable conduit means with a flow control valve is provided for conveying a predetermined amount of the anti-oxidant to cooking oil within the deep fat cooking vessel. The method of the present invention includes mixing an anti-oxidant with water in an emulsion and dispensing the mixture into heated cooking oil at a selected rate to maintain a constant and uniform level of anti-oxidant in the cooking oil during cooking.

4 Claims, 1 Drawing Figure

U.S. Patent    Sept. 19, 1978    4,115,597
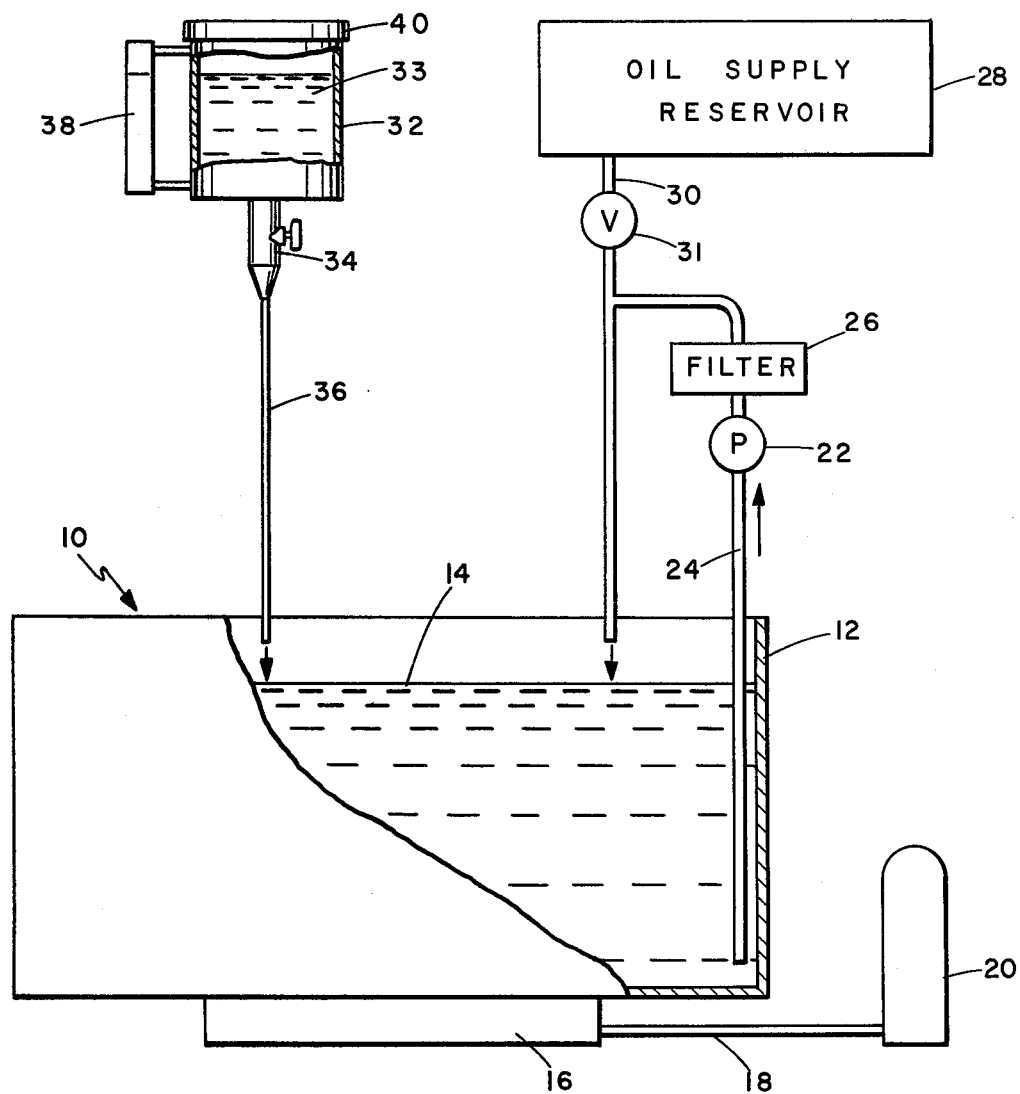

METHOD FOR MAINTAINING UNIFORM LEVEL OF ANTI-OXIDANT IN HEATED COOKING OIL

BACKGROUND OF THE INVENTION

The present invention relates to deep fat cooking and particularly to commercial cooking and pertains particularly to a method and apparatus for preventing rancidity of the cooking oil.

Deep fat cooking is widely used in restaurants for cooking potatoes, chicken, fish and other such edible products. Deep fat cooking involves the immersion of the article to be cooked in hot cooking oil. The oil is normally heated to a suitable cooking temperature in a deep cooking vessel.

One problem with such deep fat cooking is that cooking oils at elevated temperatures become rancid fairly rapidly. Many manufacturers of cooking oils put anti-oxidant into the cooking oil during manufacture. This extends the life of the cooking oil beyond what it ordinarily would be.

However, as soon as the anti-oxidant has deteriorated, peroxides form rapidly and the cooking oil soon becomes rancid. Such rancidity is not only unhealthy, but creates an unpleasant taste in the food cooked therein.

SUMMARY AND OBJECTS OF THE INVENTION

Accordingly, it is the primary object of the present invention to overcome the above problem of the prior art.

Another object of the present invention is to provide method and apparatus to prevent the rapid deterioration of cooking oils.

A further object of the present invention is to provide method and apparatus for maintaining uniform level of anti oxidant in heated cooking oil.

In accordance with the primary aspect of the present invention, uniform level of anti oxidant is maintained in a heated cooking oil by emulsifying the anti-oxidant in a mixture of water and dispensing the mixture by way of a dispensing apparatus with adjustable valve means and conduit means into the cooking oil.

BRIEF DESCRIPTION OF THE DRAWING

The above and other objects and advantages of the present invention will become apparent from the following description when read in conjunction with the drawings wherein:

The single FIGURE illustrates, substantially diagrammatically, the complete apparatus.

DETAILED DESCRIPTION OF THE PREFERRED EMBODIMENT

Turning now to FIG. 1 of the drawing, a cooking system in accordance with the invention is generally designated by the numeral 10, comprising a cooking vessel of the deep fat frying type 12 for containing a quantity of cooking oil 14. The cooking oil may be of any suitable well known oil such as corn oils, vegetable oil, animal fats, and/or any combination of both, such as, for example, lard and/or soy bean oil. Heat is applied to the vessel 12 by suitable fuel by way of a suitable line or conduit means 18 from a source 20.

The cooking oil is preferably circulated through suitable filtering means 26 for removing particulate matter therefrom. Such filtering systems are well known in the art and may be a filter using diatomaceous earth, for example. A suitable filtering system may include a pump 22 drawing oil by way of a conduit 24 and running it through a filter 26 and back to the vessel 12. A suitable source of make-up oil such as a reservoir 28 may be provided for supplying oil by way of suitable conduit 30 and valve 31, to maintain a predetermined level of cooking oil within the vessel 12.

In accordance with the present invention, an anti-oxidant addition and replenishing system comprises a suitable reservoir 32 for containing a quantity of anti-oxidant 33. The reservoir 30 is connected to supply the anti-oxidant at a selected predetermined distribution, rate and solution level by way of an adjustable drip valve means 34 and conduit means 36 to the cooking oil 14 within the vessel 12. The anti-oxidant reservoir 32 includes a sight glass 38 for visually indicating the level of anti-oxidant within the reservoir. A suitable removable cover 40 may be provided on the reservoir for replenishing the supply of anti-oxidant.

In accordance with the present invention, the anti-oxidant is supplied to this system as an aqueous emulsion. The addition of the water provides a turbulence when the emulsion is dispensed into the liquid or hot oil 14. Since the cooking oil is in a range of above 350° F. for normal conditions, the water immediately vaporizes on contact with the oil. This creates turbulence within the oil for rapidly mixing anti-oxidant in the oil within the vessel. This method of introducing the anti-oxidant into the cooking oil produces an agitating or self-agitating action without mechanical help. The instant vaporization under water within the mixture of anti-oxidant and water creates the turbulence for agitating the mixture and dispering it in the cooking oil.

In a preferred embodiment, any suitable anti-oxidant is mixed in the ratio of approximately ⅓ water, ⅓ emulsifier, and ⅓ anti-oxidant. The water increases the specific gravity of the solution causing the solution to bubble violently just below the hot cooking oil level thus creating the mixing and agitation of the oil and anti-oxidant.

In accordance with the present invention, the dispenser introduces a continuous but intermittent flow of anti-oxidant into the hot fat thereby preventing the fat from becoming oxidized and rancid. By continuously introducing an anti-oxidant into the hot fat at a predetermined minimum rate, oxidation is constantly prevented.

While the water anti-oxidant mixture is a preferred form, the present dispenser is not limited to the water emulsified anti-oxidant but any type of anti-oxidant may be used. However, the water solution is preferred since it improves the distribution of the anti-oxidant within the cooking fat.

Tests have shown that this method of controlling the anti-oxidant level in the cooking oil will result in the cooking oil lasting up to 500% longer without signs of oxidizing or rancidity. This maintains a lower peroxide level within the oil and better coloring thereof.

Examples of anti-oxidant are sold under the trade names BHA or Butylated hydroxyanisal and BHT or Butylated hydroxytoluene. Other equivalent anti-oxidants may be utilized.

While the present invention has been described and illustrated by means of a single embodiment, it is to be understood that numerous changes and modifications may be made in the invention without departing from the spirit and scope thereof as defined in the appending claims.

Having described my invention, I now claim:

1. The method of dispersing anti-oxidant directly into cooking oil in a cooking vessel, the method comprising the steps of:

provBiding a cooking vessel containing a quantity of cooking oil at an elevated temperature sufficient to effect deep fat cooking, providing a supply of anti-oxidant as an aqueous emulsion, and introducing said anti-oxidant aqueous emulsion directly into said cooking oil, said anti-oxidant aqueous emulsion having a specific gravity sufficient to cause the anti-oxidant aqueous emulsion to pass directly into the heated cooking oil thereby vaporizing water and creating turbulence within the heated cooking oil that disperses the anti-oxidant throughout the cooking oil, said anti-oxidant aqueous emulsion added at a rate sufficient to maintain a dispersed effective level of anti-oxidant in the heated cooking oil.

2. The method of claim 1 being characterized by:
said anti-oxidant aqueous emulsion comprising a mixture of anti-oxidant with equal parts of water.

3. The method of claim 1 being characterized by:
said anti-oxidant aqueous emulsion comprising about one-third water, one-third emulsifier and one-third anti-oxidant.

4. The method of claim 1 further comprising the steps of:

providing a reservoir of cooking oil separate from said anti-oxidant aqueous emulsion and feeding additional cooking oil to said cooking vessel in amounts necessary to replenish said cooking oil and further providing a filtering means for filtering the cooking oil in said cooking vessel separate from adding anti-oxidant aqueous emulsion to said cooking oil.

* * * * *